United States Patent [19]

Takeuchi et al.

[11] 4,355,319

[45] Oct. 19, 1982

[54] SYSTEM FOR THERMALLY RECORDING DATA BY PARTIALLY OVERLAPPING SUCCESSIVE DATA SEGMENT PERIODS

[75] Inventors: Tadasu Takeuchi, Chofu; Hidetsugu Ishikawa; Masaaki Nagase, both of Tokyo, all of Japan

[73] Assignee: Matsushita Graphic Communication Systems, Inc., Tokyo, Japan

[21] Appl. No.: 235,021

[22] Filed: Feb. 13, 1981

[30] Foreign Application Priority Data

Feb. 14, 1980 [JP] Japan .................................. 55-17468

[51] Int. Cl.$^3$ .......................................... G01D 15/10
[52] U.S. Cl. ............................... 346/76 PH; 400/120; 219/216
[58] Field of Search ................... 346/76 PH; 400/120; 219/216

[56] References Cited

U.S. PATENT DOCUMENTS 3,934,695  1/1976  Kovalick ................... 346/76 PH X

FOREIGN PATENT DOCUMENTS 55-101476  8/1980  Japan ................................... 400/120
55-128478 10/1980  Japan .............................. 346/76 PH Primary Examiner—Gene Z. Rubinson
Assistant Examiner—W. J. Brady
Attorney, Agent, or Firm—Lowe, King, Price & Becker

[57] ABSTRACT

In a thermal recording system wherein a linear array of elemental resistance electrodes is employed to record received data bits which are organized into data segments of equal bits, the resistance array is divided into a plurality of identical blocks (#1 to #64) corresponding to the data segments. Successively arranged resistance blocks are selected by a selector (42) in response to first and second write-command pulses supplied from pulse generators (22, 24) in synchronism with the receipt of each data segment to record black dots corresponding to the received data bits. The first and second write-command pulses are generated so that the period of each pulse partially overlaps the period of the other, whereby the preceding resistance block is selected simultaneously with the subsequent one after the corresponding data bits have been removed. After-effect currents are supplied to the preceding block to increase the image density of the recorded black dots while the recording of the subsequent data segment is in progress. The after-effect currents are not sufficient to heat up the resistance elements which correspond to white areas.

8 Claims, 10 Drawing Figures

SYSTEM FOR THERMALLY RECORDING DATA BY PARTIALLY OVERLAPPING SUCCESSIVE DATA SEGMENT PERIODS

BACKGROUND OF THE INVENTION

The present invention relates to a recording system of the type wherein black dots are produced by thermally heating a heat-sensitive recording medium by energizing a linear array of resistance heating elements in response to facsimile signals or computer output data.

The resistance elements are arranged in a plurality of blocks or successive groups so that the latter corresponds to data segments of the signal to be recorded. Conventionally, each resistance block is energized during a period exactly corresponding to the period in which the data segment is received from a data source. Since the heating elements are not capable of quickly responding to high speed data, conventional methods tend to impose limitations on data transmission time for facsimile applications or on data handling capacity for computer applications.

In order to overcome this problem prior art attempts involve the use of a heater for purposes of preheating the resistance elements. However, the prior art attempts are not satisfactory since a substantial amount of heat is generated during standby or standstill periods.

SUMMARY OF THE INVENTION

According to a broader aspect of the invention, the elemental resistance electrodes of each block are energized by currents generated in correspondence with the presence or absence of the received data bits to produce corresponding black dots. After disconnection of heat generating currents from the electrodes, aftereffect currents are further supplied from a voltage source or sources for a period sufficient to increase the image density of the recorded black dots but insufficient to heat up the electrodes which correspond to white areas, while allowing the next data segment to be recorded at the same time. Thus, each data segment is recorded for a period longer than the period in which it is received, whereby black images of high contrast against the white background are produced without the need for increasing the total recording time and hence the data transmission time.

Preferably, the aftereffect currents are supplied to all of the heating elements of the block from which the recording data bits have just been removed, regardless of the data bits which are supplied to the heating elements.

According to a specific aspect of the invention, the recording system is adapted to receive signals organized into a plurality of data segments of equal data bits each and includes a linear array of heating elements arranged in a plurality of identical blocks corresponding to the data segments with the heating elements of each block corresponding to the data bits. The recording system comprises means for alternately generating first and second pulses of a period greater than the period during which each of the data segments is received so that the period of the first pulse partially overlaps the period of the second pulse, and means responsive to the first and second pulses for supplying the heating elements of successive ones of the blocks with heating currents corresponding to the data bits.

According to a further specific aspect of the invention, the recording system comprises first and second memories each having a plurality of storage locations corresponding to the data bits of each data segment, means for alternately writing the data segments into said first and second memories and simultaneously reading the stored data bits out of an alternate one of the memories, means for successively selecting the blocks of heating elements in synchronism with the receipt of each data segment so that adjacent blocks are simultaneously selected for a period smaller than the period in which each data segment is received, and means for energizing the heating elements of the selected block in response to the data bits read out of the memories.

BRIEF DESCRIPTION OF THE DRAWINGS

The invention will be further described by way of example with reference to the accompanying drawings, in which.

DETAILED DESCRIPTION

Figure 1:
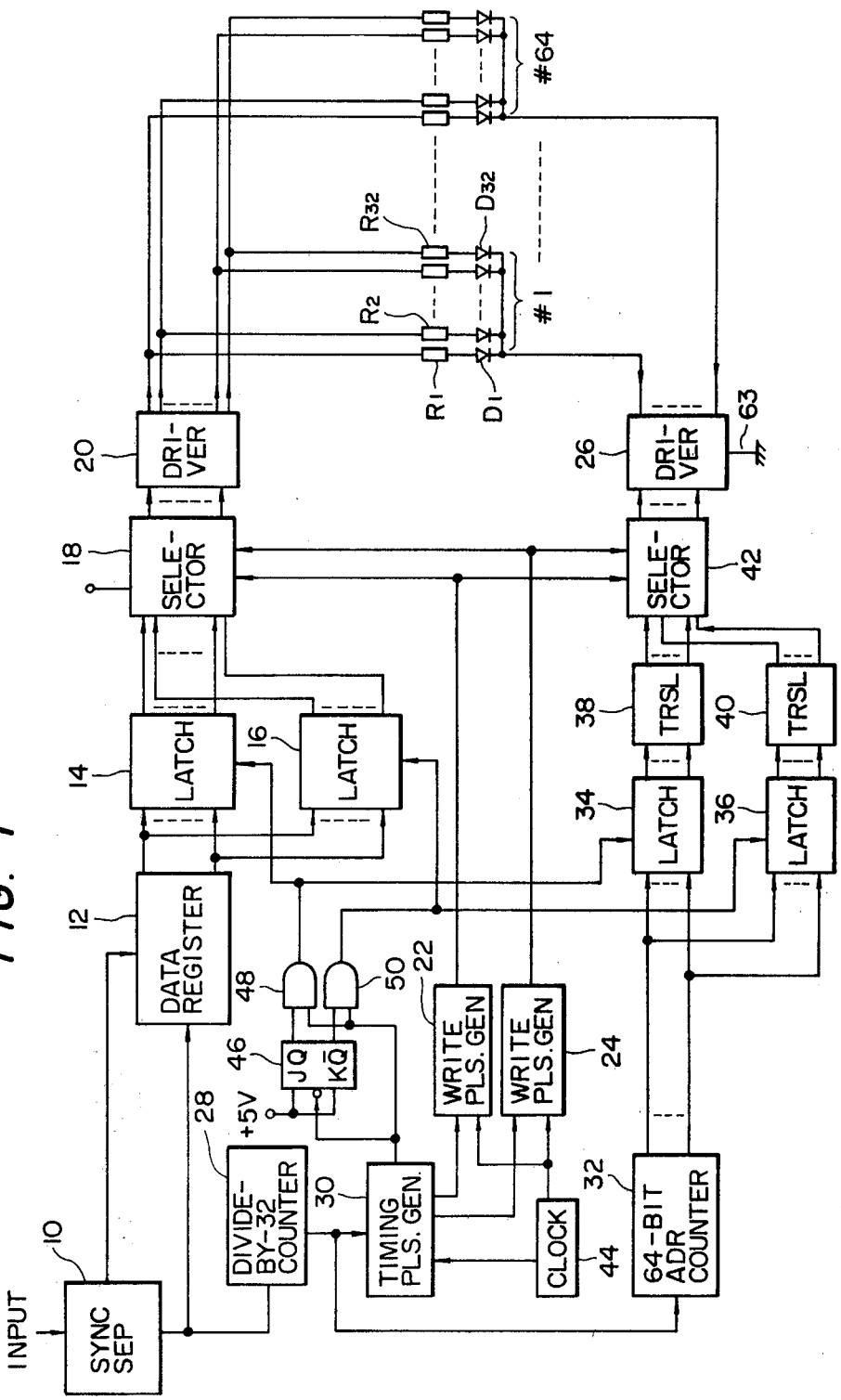
FIG. 1 is an illustration of a block diagram of an embodiment of the present invention.

The thermal recording system of the present invention as represented in FIG. 1 is provided with a linear array of resistance heating elements, 2048 in number for example, which are organized into 64 blocks of 32 elements each. Facsimile signals transmitted from the distant end of a transmission line are received at a modem equipment, not shown, where the received signals are converted into a stream of picture digital pulses for each line scan containing a stream of clock pulses so interleaved with the data pulses the pictorial data stream is organized into 64 data blocks of 32 bits each corresponding to the resistance blocks of the thermal recording array. The facsimile line data are applied to a sync separator 10 where the pictorial digital pulses and the clock pulses are separated from one another and applied to a data register 12 having 32 output leads corresponding in number to the number of resistance elements of each heater block. The outputs of the data register 12 are connected to latches 14 and 16 to alternately supply them with successive block data pulses so that when the latch 16 is writing one block data the latch 14 is reading out its stored contents of the preceding block data. The outputs of the data latches 14 and 16 are applied to a data selector 18 which selectively applies the block data pulses to a current-supply driver 20 in response to write command pulses provided by write pulse generators 22 and 24. The current-supply driver 20 is provided with 32 output leads which are connected in multiple to the respective resistance elements R1 to R32 of each of the resistance blocks identified by #1 to #64. The resistance elements of each block are coupled through respective diodes D1 to D32 to a common terminal which is connected to the corresponding input of a current-sink driver 26.

The sync pulses separated by sync separator 10 are also applied to a divide-by-32 counter 28 which in turn supplies its output to a timing pulse generator 30 and to a 64-bit address counter 32 having six output leads to represent the location of resistance blocks in binary number. The outputs of the address counter 32 are in turn connected to latches 34 and 36 which alternately store the address signals and read out the stored address signals. The outputs of the address latches 34 and 36 are respectively coupled to translators 38 and 40 which translate the address signals into a block select signal which appears at a corresponding one of 64 output leads of the respective translators 38 and 40. The outputs of the translators 38 and 40 are fed to a block selector 42 to selectively apply the block select signal to the current-sink driver 26 in response to the write-command pulses supplied from the pulse generators 22 and 24. The current-sink driver 26 provides a grounded connection to the resistance elements of a block selected.

Figure 2:
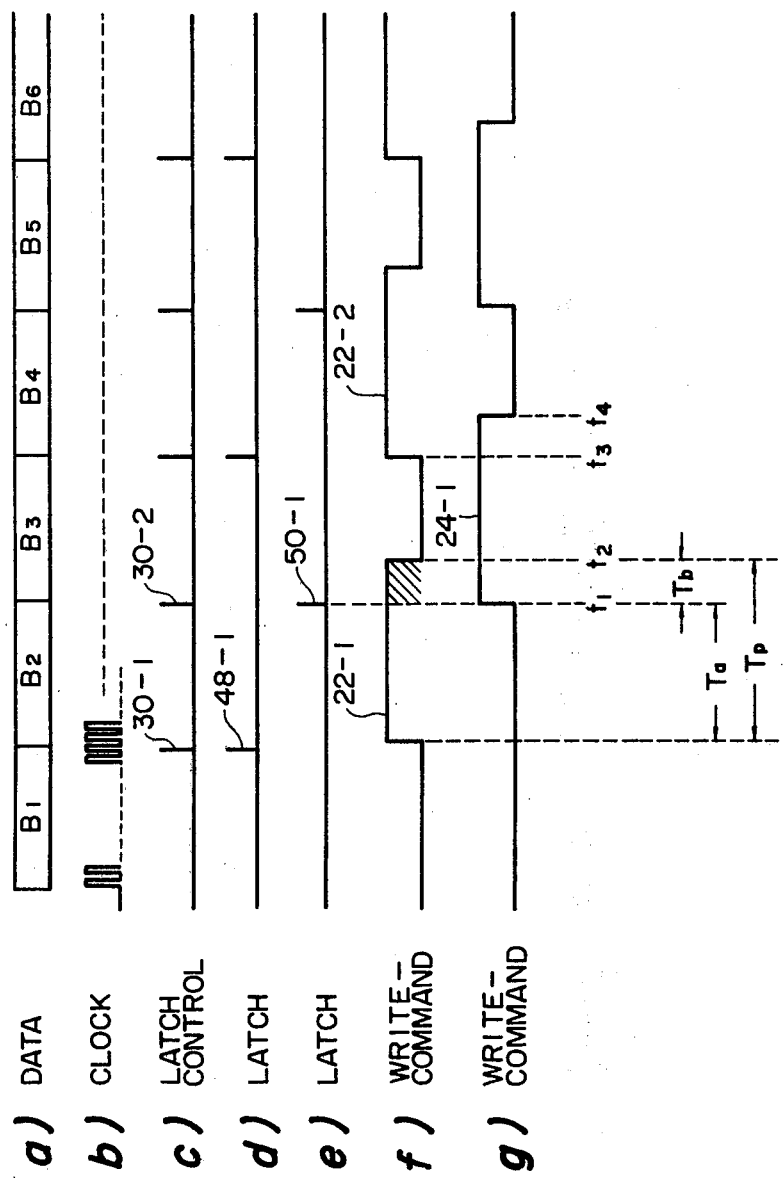
FIGS. 2a to 2g are illustrations of a timing diagram useful for describing the operation of the FIG. 1 embodiment.

The timing pulse generator 30 is also in receipt of clock pulses locally supplied from a clock source 44 to generate a latch control pulse in synchronism with the output of the divide-by-32 counter 28 and applies it to the toggle input of a J-K flip-flop 46 and to AND gates 48 and 50. The timing pulse generator 30 also generates count-start pulses which alternately occur in synchronism with the latch control pulse as illustrated in FIGS. 2a to 2e, the count-start pulses being respectively supplied to the write pulse generators 22 and 24. The write pulse generators 22 and 24 each comprise a prefixed binary counter which receives clock pulses from the clock source 44 to initiate the counting operation in response to the count-start pulse provided by the timing pulse generator 30. As shown in FIGS. 2f and 2g, the write pulse generators 22 and 24 generate rectangular pulses of a duration which is slightly greater than the interval between successive latch control pulses during which each block data is present.

Figure 3:
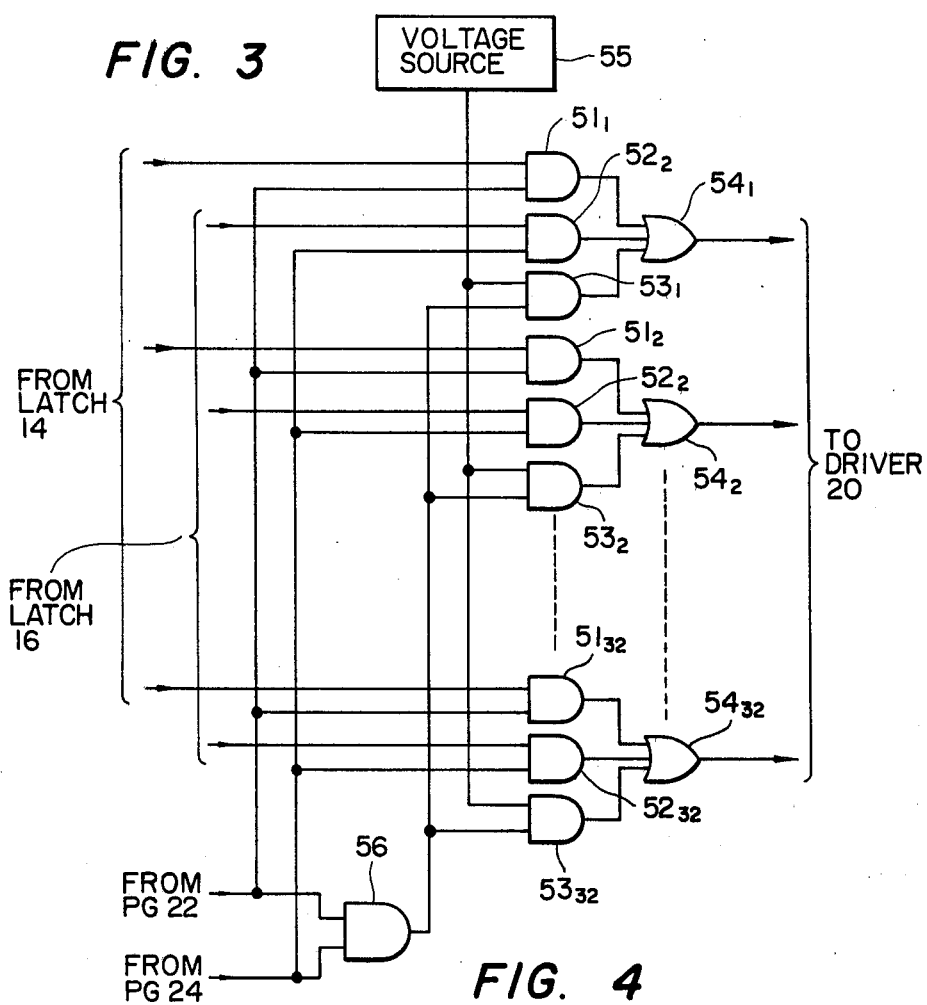
FIG. 3 is an illustration of the detail of the data selector of FIG. 1.

Details of the data selector 18 are shown in FIG. 3. As illustrated the data selector 18 comprises a first set of AND gates $51_1$ and $51_{32}$, a second set of AND gates $52_1$ to $52_{32}$ and a third set of AND gates $53_1$ to $53_{32}$. The outputs of the AND gates identified by the same subscript are connected to a respective one of OR gates $54_1$ to $54_{32}$. Each of the first set of AND gates $51_1$ to $51_{32}$ has one of its inputs connected to the respective output of the latch 14 and the other input connected in multiple with the corresponding inputs of the other AND gates 51 to the output of the write pulse generator 22. On the other hand, each of the second set of AND gates $52_1$ to $52_{32}$ has one of its inputs connected to the respective output of the latch 16 and the other input connected in multiple with the corresponding inputs of the other AND gates 52 to the output of the write pulse generator 24. Whereas, the third set of AND gates 53 have their individual inputs connected respectively to a common voltage source 55, typically at 5 volts, and to the output of a common AND gate 56 whose inputs are connected to the outputs of the write pulse generators 22 and 24.

It will be seen from FIG. 3 that the write-command pulses supplied from the generators 22 and 24 will respectively enable the first and second AND gates to generate a logical one output, typically at 5 volts, at the output of the AND gate which is in receipt of a pictorial data bit from the corresponding output of the latch 14 or 16. The logical one or zero outputs from the data selector 18 are coupled via the OR gates 54 over 32 parallel lines to the respective inputs of the current-supply driver 20. The current-supply driver 20 essentially comprises a plurality of transistor gates which respectively receive the outputs of the data selector 20 to apply an energization voltage of 10 to 20 volts to the heating elements which correspond to the logical one outputs supplied from the data selector 18. Heating currents are drawn into only those of the heating elements of the block which is selected by the block selector 26.

Since each of the write pulses has a slightly longer period than the period of each data block as described above, each write-command pulse partially overlaps the other write-command pulse as seen in FIGS. 2f and 2g. As a result, the AND gate 56 provides a logical one output to the AND gates $53_1$ to $53_{32}$ to place logical one outputs of typically 5 volts at the outputs of the OR gates $54_1$ to $54_{32}$ simultaneously. Therefore, all the heating elements of a selected block are impressed with the energization potential during this overlap period. However, this overlapping period is chosen so that it is not sufficient to cause a heating element to be heated up to a level at which a black spot is recorded if this heating element has not been heated during the time immediately prior to the overlapping period. Also, this overlapping period serves to further heat up those elements which have been heated during the time prior to the overlapping period. Thus it can be said that a black dot is recorded for a longer duration than the period in which the corresponding pictorial block data is present. This means that the recording time is lengthened without increasing the data transmission time. Otherwise stated, the transmission time can be reduced without degrading the picture quality.

The operation of the recording system of the present invention will be fully understood with reference to the waveforms of FIGS. 2a to 2g. The pictorial data pulses are represented in FIG. 2a as comprising successively occurring data blocks identified as $B_1$, $B_2$ ... $B_{64}$ (only a portion of which is illustrated for simplicity) and the transmitted clock pulses are represented in FIG. 2b as corresponding to the data pulses contained in each block. The data register 12 reads in the first block data $B_1$ in synchronism with the received clock pulse. Upon the count of 32 clock pulses which are contained in the data block $B_1$, the divide-by-32 counter 28 generates a first output pulse which causes the timing pulse generator 30 to generate a first latch control pulse 30-1 which activates the AND gate 48 to generate a latch pulse 48-1 to store the data $B_1$ from the data register 12 in 32 storage locations. Simultaneously with the first latch control pulse 30-1, a first count-start pulse is generated to cause the write pulse generator 22 to provide a write-command pulse 22-1. This write-command pulse is applied to the data selector 18 and to the block selector 42 so that the block data $B_1$, now stored in the latch 14, are transferred to the data selector 18 to apply energization potentials to the heating elements. In response to the first output pulse from the divide-by-32 counter 28, the 64-bit address counter 32 provides an address signal corresponding to the #1 resistance block, this address digital being stored in the latch 34 in response to the latch pulse 48-1 and translated by the translator 38 so that the #1 output lead of the translator 38 is activated. The block selector 42 establishes a connection between the #1 output lead of the translator 38 and the current-sink driver 26 so that the heating elements R1 to R32 of the #1 block are connected to a ground termination 63. Therefore, the block data $B_1$ are recorded during the period Tp of the write-command pulse 22-1 during which the period Ta corresponds to the data block interval and the period Tb overlaps a write-command pulse 24-1 which is subsequently generated by the write pulse generator 24.

Upon the subsequent count of 32 clock pulses, the divide-by-32 counter 28 generates a second output which causes the timing pulse generator 30 to generate a second latch control pulse 30-2. In response to the pulse 30-2, the AND gate 50 provides a latch pulse 50-1 which is supplied to the latches 16 and 36. The second block data $B_2$, now stored in the data register 12, are transferred to the latch 16 while the address counter 32 provides a second address signal for the #2 resistance block to the latch 36 to make a record of block data $B_2$ during the period of the write-command pulse 24-1 which is generated in response to the latch pulse 50-1. It is thus seen that the subsequent block data $B_3$, $B_4$ and so forth are recorded in time intervals corresponding to subsequent write-command pulses 22-2, 24-2 and so forth.

It is to be noted that during a time interval $t_1$ to $t_2$ in which the #1 and #2 blocks are simultaneously selected, that the white-level resistance elements of the #2 block, which do not correspond to the activated AND gates of the data selector 18, are heated. As described previously, the duration Tb is not sufficient to cause the heating element to be heated up to the recording level. However, this preheating will affect the temperature of the white-level resistance elements when they are again heated during subsequent interval $t_3$ to $t_4$ in which the black-level resistance elements of the #2 block are further heated. Therefore, the period Tp is chosen so that 2Tb is smaller than Ta.

Figure 4:
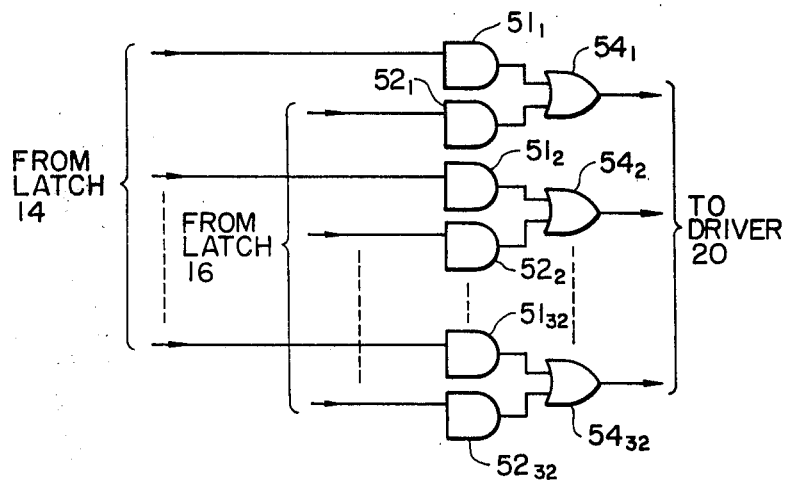
FIG. 4 is an illustration of a modified form of the data selector of FIG. 1.

Since the data bits of adjacent blocks are known to have a relatively high degree of correlation, the black level signals of the subsequent block can be utilized as a source of heating currents. This is done by eliminating the AND gates $53_1$ to $53_{32}$ and the common AND gate 56 from the previous embodiment as illustrated in FIG. 4 to allow the black level signals of a subsequent block to be impressed on the resistance elements of the preceding block.

In summary, the present invention could be achieved by energizing the resistance elements of each block during a period which is greater than the period in which each data block is received.

What is claimed is:

1. A recording system adapted to receive signals organized into a plurality of data segments of equal data bits each and having a linear array of heating elements arranged in a plurality of identical blocks corresponding to said data segments, the heating elements of each block corresponding to said data bits, comprising:
   means for alternately generating first and second pulses of a period greater than the period during which each of said data segments is received so that the period of said first pulse partially overlaps the period of said second pulse; and
   means responsive to said first and second pulses for supplying the heating elements of successive ones of said blocks with heating currents corresponding to said data bits.

2. A recording system as claimed in claim 1, wherein said current supplying means comprises means for successively selecting said blocks of heating elements in response to said first and second pulses so that the heating elements of adjacent blocks are simultaneously selected during said overlapping period, and means for supplying currents to the heating elements of said selected blocks corresponding to said data bits.

3. A recording system as claimed in claim 1 or 2, further comprising means for simultaneously supplying all of the heating elements of said successively arranged blocks with heating currents during said overlapping period.

4. A recording system as claimed in claim 3, wherein means for simultaneously supplying currents to all of said heating elements comprises a coincidence gate for generating a coincidence signal in response to there being a simultaneous presence of said first and second pulses, and means including a plurality of gates for supplying currents to all of the heating elements of said selected blocks in response to said coincidence signal.

5. A recording system adapted to receive signals organized into a plurality of data segments of equal data bits each and having a linear array of heating elements arranged in a plurality of identical blocks corresponding to said data segments, the heating elements of each block corresponding to said data bits, comprising:
   first and second memories each having a plurality of storage locations corresponding to the data bits of each data segment;
   means for alternately writing said data segments into said first and second memories and simultaneously reading the stored data bits out of an alternate one of said memories;
   means for successively selecting said blocks of heating elements in synchronism with the receipt of each of said data segments so that adjacent blocks are simultaneously selected for a period smaller than the period in which each data segment is received; and
   means for energizing the heating elements of the selected block in response to the data bits read out of said memories.

6. A recording system as claimed in claim 5, wherein said energizing means comprises means for supplying currents to all the heating elements of the simultaneously selected blocks regardless of the data bits.

7. A recording system as claimed in claim 6, wherein said successively selecting means comprises means for alternately generating first and second pulses of a period greater than the period during which each of said data segments is received, a coincidence gate for generating a coincidence signal in response to there being a simultaneous presence of said first and second pulses, and wherein said energizing means comprises means for supplying all of the resistance elements of the simultaneously selected blocks with heating currents in response to said coincidence signal.

8. A recording system as claimed in claim 5, wherein said smaller period is smaller than one-half of said period in which each said data segment is received.

* * * * *